US006215799B1

United States Patent
Mitchell et al.

(12) United States Patent
(10) Patent No.: US 6,215,799 B1
(45) Date of Patent: Apr. 10, 2001

(54) ANALOG TELEPHONE TO ISDN INTERFACE APPARATUS AND METHOD THEREFOR

(75) Inventors: Eric P. Mitchell, Vancouver, WA (US); Michael R. Fine, Ogden, UT (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 08/976,794

(22) Filed: Nov. 24, 1997

(51) Int. Cl.[7] ............................................. H04J 3/16
(52) U.S. Cl. ................................................... 370/524
(58) Field of Search ............................. 370/524, 465, 370/466, 467, 525, 522, 904, 264, 463, 450; 379/399, 219, 225, 229, 231, 93.06, 93.08, 93.09, 93.11, 93.15, 93.14, 93.31

(56) References Cited

U.S. PATENT DOCUMENTS

| | | | |
|---|---|---|---|
| 5,255,317 | 10/1993 | Arai et al. .............................. | 379/399 |
| 5,305,377 | 4/1994 | D'Arcy et al. ........................ | 379/399 |
| 5,341,374 * | 8/1994 | Lexen et al. .......................... | 370/450 |
| 5,341,418 | 8/1994 | Yoshida ................................. | 379/399 |
| 5,381,412 * | 1/1995 | Otani ..................................... | 370/391 |
| 5,448,635 | 9/1995 | Biehl et al. ............................ | 379/399 |
| 5,450,412 | 9/1995 | Takebayashi et al. ............... | 370/95.1 |
| 5,459,788 | 10/1995 | Kim ........................................ | 379/399 |
| 5,473,682 | 12/1995 | Tanaka .................................. | 379/372 |
| 5,479,498 | 12/1995 | Brandman et al. ................... | 379/283 |
| 5,521,976 | 5/1996 | Janosch et al. ....................... | 379/397 |
| 5,621,732 | 4/1997 | Dale et al. ............................. | 370/58.1 |
| 5,802,045 * | 9/1998 | Kos et al. .............................. | 370/522 |
| 5,815,505 * | 9/1998 | Mills ...................................... | 370/522 |
| 5,815,562 * | 9/1998 | Iglehart et al. ....................... | 370/264 |

* cited by examiner

Primary Examiner—Dang Ton
(74) Attorney, Agent, or Firm—Workman, Nydegger & Seeley

(57) ABSTRACT

A method and portable ISDN interface module for interfacing both a computer or digital device having a framed data format such as HDLC with an analog telephone over integrated partitioned ISDN channels is provided. The portable ISDN interface module comprises an analog telephone interface, a controller or mechanism for generating and managing the partitioned channels of an ISDN service and an ISDN interface. The analog telephone interface receives and transmits analog information with an analog telephone or other analog device such as a fax/modem between the corresponding external devices and the ISDN interface. The controller or channel generating means implements the channelization or partitioning of the physical link between the portable ISDN interface module and the ISDN. The ISDN interface provides encoding and decoding of analog information and multiplexes the various information sources such as digitized analog telephone information and digital data information into the corresponding ISDN partitioned channels. The ISDN interface presents both an S/T-interface and a U-interface to the ISDN system. Additional telephony functionality such as answering machine and speed-dialing are also provided.

22 Claims, 3 Drawing Sheets

ANALOG TELEPHONE TO ISDN INTERFACE APPARATUS AND METHOD THEREFOR

BACKGROUND OF THE INVENTION

1. The Field of the Invention

The field of the invention relates to interfacing, analog and digital devices with a digital network system such as an Integrated Services Digital Network (ISDN) system. Additionally, the invention also relates to concurrently interfacing analog devices such as telephones, faxes, modems and computers to compatibly interface with an ISDN system. More particularly, the invention relates to providing an integrated, portable module for interfacing both analog and digital devices with an ISDN system.

2. Present State of the Art

Through recent decades, the majority of data transmitted between two locations utilized analog transmission devices such as analog telephones or analog modems. Analog networks facilitated interconnection of analog devices and provided a conduit for analog information exchange therebetween. As analog networks became congested and inadequate for facilitating the transfer of significant amounts of analog information, digital systems including high bandwidth systems were conceived. One such popular modern system includes the ISDN system wherein information is transferred and maintained in digital format. Furthermore, higher bandwidth encoding and modulation techniques facilitate the exchange of yet significant amounts of data between users.

As ISDN systems are becoming more ubiquitous, users are desiring access to larger reservoirs of digital data. To satisfactorily facilitate the exchange of significant amounts of digital data, users and network providers are migrating to higher bandwidth technology such as ISDN. Since the ISDN system accommodates the exchange of digital data only, all analog information must be digitized before transmission.

Additionally, users transitioning from an analog system to a digital system prefer continued use of existing analog devices as opposed to obsoleting such devices already procured. To facilitate the reuse of analog devices in a digital system, adapters have been developed to interface existing analog devices with the ISDN system. Referring to FIG. 1, an analog telephone 12 may independently operate in an analog telephone system, however, in a digital network, a terminal adapter 14 must transform an analog telephone signal from analog telephone 12 to a digitized and formatted digital data signal compatible with the digital standards of an ISDN system 10. Likewise, other analog devices such as a fax/modem 16 interact using analog signals and therefore must also utilize a terminal adapter 18 to facilitate conversion from an analog signal to a digital signal compatible with ISDN system 10. Furthermore, traditional digital devices such as a computer 20 employing an analog modem 22 for generation of interfacing analog signals must also utilize a terminal adapter 24 to convert the analog signals generated by analog modem 22 into a digitized format compatible with ISDN system 10.

Additionally, in an arrangement wherein a plurality of devices are to be employed, a network termination adapter (NT-1) 26 converts the 2-wire ISDN line from the telephone company, called the U interface, into an 8-wire S/T interface. An NT-1 26 may be employed when a user desires connectivity of multiple devices to one ISDN system. Therefore, referring to FIG. 1, to facilitate coupling analog phone 12, fax/modem 16 and computer 20 to ISDN system 10, three terminal adapters (14, 18 and 24), and an NT-1 26 are required to accommodate interfacing an analog phone, a fax/modem and a computer to an ISDN system.

Furthermore, modern applications of computers such as notebook computers dictate a portable or mobile environment wherein a user transports, carriers or otherwise has available to them portable office hardware such as a computer, a telephone and a fax. Such an operational environment renders the use of multiple terminal adapters and an NT-1 impractical and burdensome.

Thus, what is needed is a system and method for integrating a plurality of interface components into a portable module capable of practical transportation by a user with a computer and an analog telephone. Also, what is needed is a system and method for interfacing an analog telephone and a computer into an ISDN system wherein the direct interface with the ISDN system may take the form of either a U-interface or an S/T-interface.

SUMMARY AND OBJECTS OF THE INVENTION

It is, therefore, an object of the present invention to provide an integrated portable ISDN interface module for interfacing an analog telephone and a computer with ISDN partitioned channels.

It is another object of the present invention to provide an integrated portable ISDN interface module for interfacing a plurality of analog devices such as an analog telephone and fax/modem with digital data information originating from a computer.

It is yet another object of the present invention to provide advanced telephony features in an integrated portable ISDN interface module such as answering machine and speed-dialing functionality.

It is a further object of the present invention to provide a method for integrating both analog information from an analog telephone and digital data information from a computer into the partitioned channels of an ISDN service.

It is still a further object of the present invention to provide an integrated portable ISDN interface module for providing multiplexing of both analog information from an analog telephone and digital data information from a computer over partitioned channels of an ISDN service regardless of whether the ISDN service presents a U-interface or an S/T-interface.

Additional objects and advantages of the invention will be set forth in the description which follows, and in part, will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an apparatus and method for integrating both an analog telephone via an analog interface and a computer via a digital data interface with the partitioned channels of an ISDN is presented.

The present invention provides a portable ISDN interface module such as an NT-1 Analog Telephone Device (NATD) for interfacing a computer or digital device having framed a framed data format such as HDLC with an analog telephone over integrated partitioned ISDN channels. HDLC formatting may be implemented by a software program located on the computer which formats data into HDLC format prior to dispatch to the portable ISDN interface module. The portable ISDN interface module comprises an analog telephone interface, a controller or other mechanism for generating and managing the partitioned channels of a typical 2B+D ISDN service and an ISDN interface.

The analog telephone interface of the portable ISDN interface module receives and transmits analog information with an analog telephone or other analog device such as a fax/modem between the corresponding external devices and the ISDN interface. Signal conditioning such as level translation is also performed to provide electrical compatibility between signalling standards of analog telephony and digital processing and manipulation logic levels. For example, TIP/RING signals and subscriber line interface circuits (SLIC) facilitate compatible interaction with standard analog telephones.

The controller or channel generating means implements the channelization or partitioning of the physical link between the portable ISDN interface module and the ISDN system. Typical ISDN service configurations take the form of 2 B-channels and 1-D-channel. In the present invention, analog telephone information is multiplexed into one of the B-channels for routing to the ISDN service provider. Digital information from the computer may be multiplexed into a remaining B-channel or alternatively into the D-channel.

The ISDN interface provides encoding and decoding of analog information via a Coder/DECoder (CODEC) which, in the preferred embodiment, forms a portion of an S/T transceiver. The S/T transceiver multiplexes the various information sources such as analog telephone information and digital data information originating from the computer into the corresponding slots as defined by the ISDN partitioned channels. The ISDN interface presents an S/T-interface to the ISDN system. Alternatively, some ISDN systems require interfacing to a U-interface which is provided by the portable ISDN interface module via an NT-1.

In one embodiment, the portable ISDN interface module also provides additional functionality such as telephony functionality and self-identifying technology. Telephony techniques such as answering machine and speed-dialing functionality may be provided by a non-volatile RAM and associated analog-to-digital and digital-to-analog converters. Self-identification, in the preferred embodiment, is provided by a unique equipment-type identifier stored within an internal non-volatile RAM. The unique-equipment identifier is readable by the computer to uniquely identify the portable ISDN interface module from other interfacing equipment types.

Naturally, other forms of integrating analog information from an analog telephone and digital data information from a computer into partitioned channels of an ISDN link may also be implemented as part of the present invention. These and other objects and features of the present invention will be more fully apparent from the following description and appended claims, or may be learned by the practice of the invention as set forth herein.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated as the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
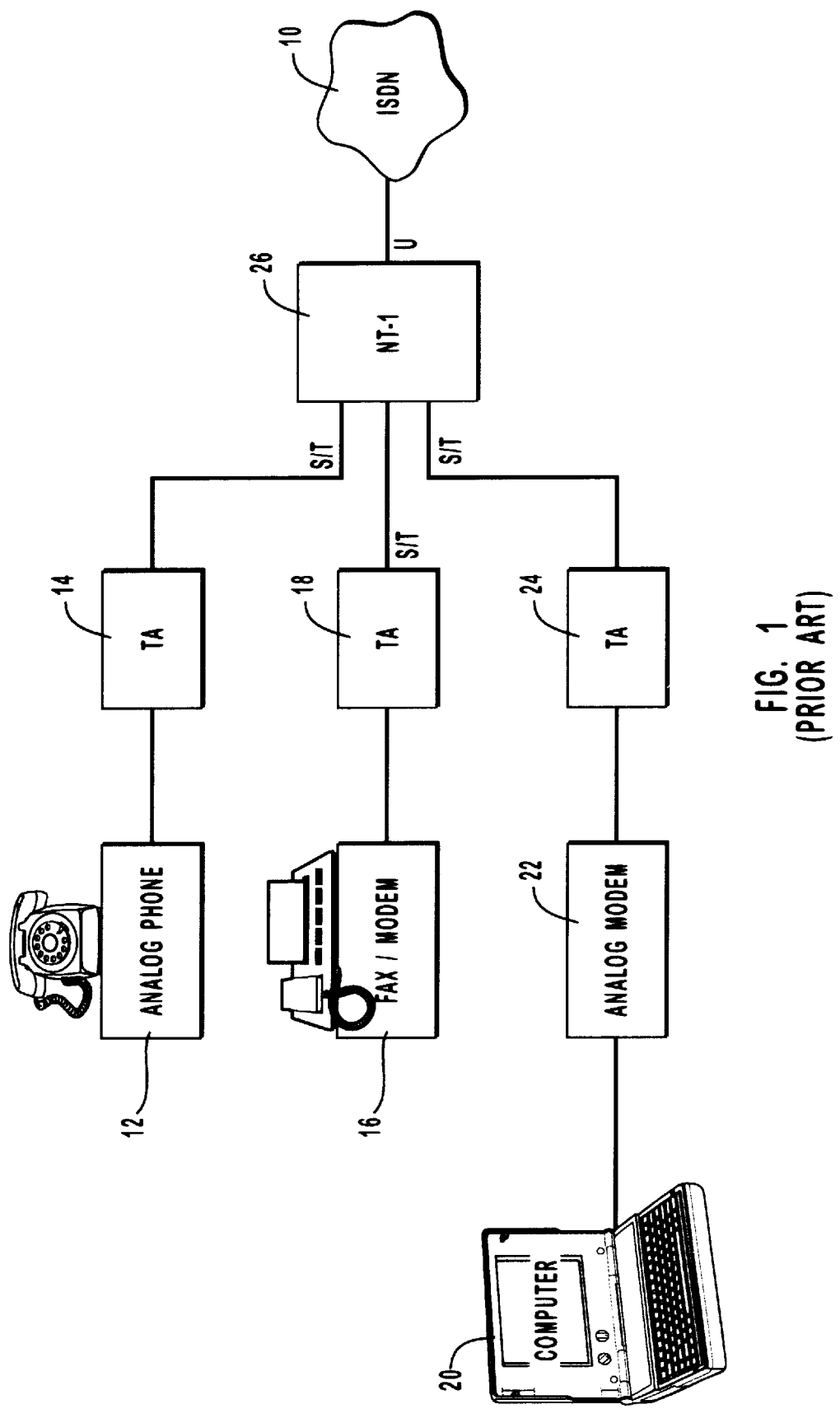
FIG. 1 is a block diagram of a configuration of analog components interfacing with an ISDN system, in accordance with the prior art description.
Figure 2:
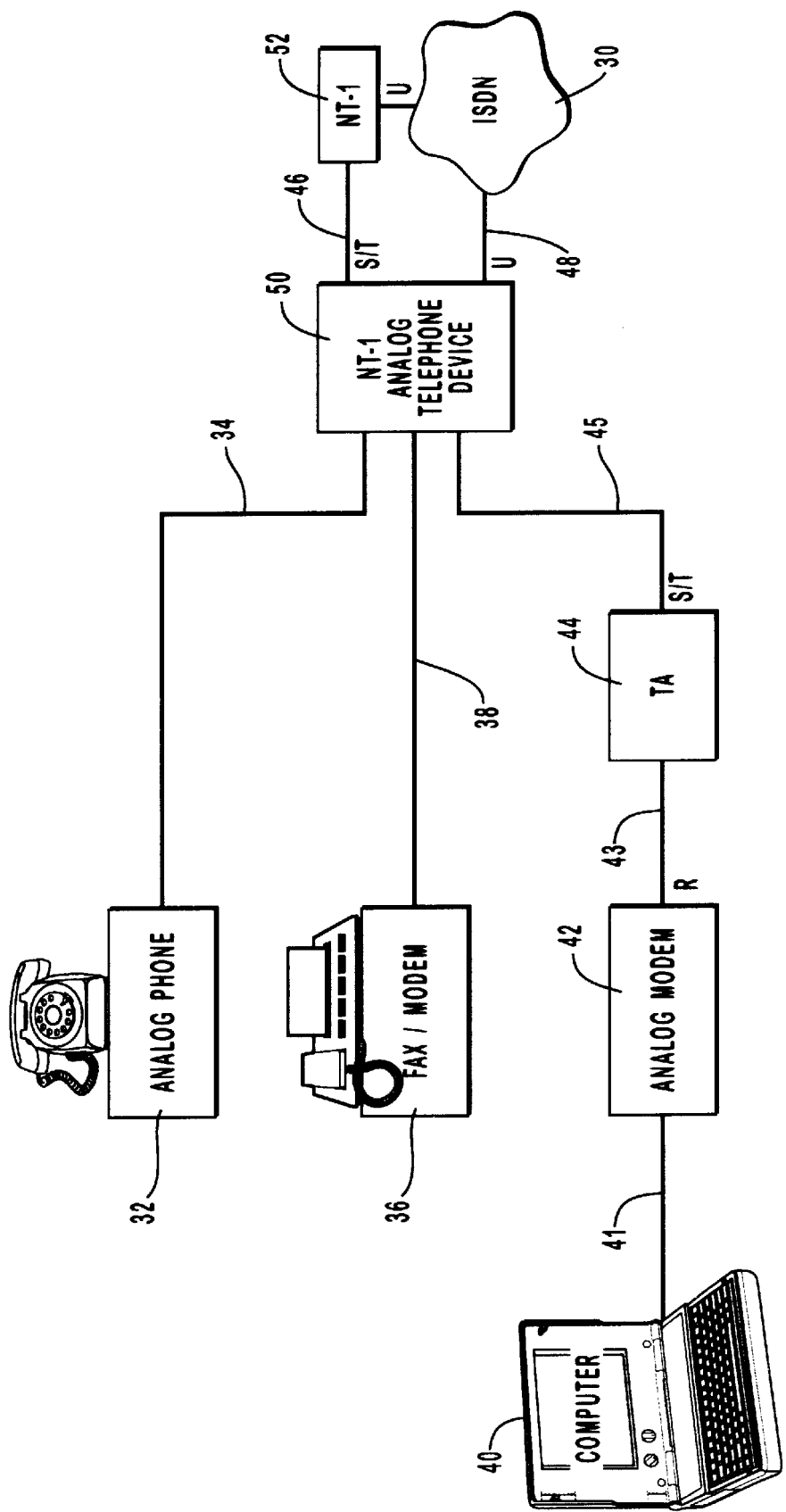
FIG. 2 is a block diagram of analog and digital devices interfacing directly to an ISDN system via a portable ISDN interface module such as an NT-1 analog telephone device, in accordance with an embodiment of the present invention.

FIG. 2 is a block diagram of a plurality of analog devices interfacing to an ISDN system via an NT-1 Analog Telephone Device (NATD), in accordance with an embodiment of the present invention. A digital network may take the form of a number of standard digital networks, one of which includes an ISDN system 30. ISDN system 30 represents an emerging technology aimed at replacing the existing analog telephone network with an all-digital network capable of handling digital data communications as well as voice communications. Numerous suppliers offer ISDN adapters for personal computers because of, the increasing desire for enhanced bandwidth capable devices for distributing and delivering digital data resulting primarily from the public acceptance of the Internet system. Since digital networks are emerging technologies, there presently exists an abundance of resources and interfaces that have heretofore employed analog communication techniques over analog communication networks such as PSTN networks. Therefore, to interface such analog devices and equipment with a digital network requires intermediary devices capable of transforming analog communication signals into digital formats for providing compatibility with digital networks.

Furthermore, an abundance of analog devices exist that presently provide a user with adequate functionality. For example, present analog telephones provide an adequate interface device for receiving and presenting voice information to a user. An analog telephone 32 when coupled in an analog system provides a user with an adequate interface mechanism for transmitting and receiving voice information. Additionally, an analog device such as a fax/modem 36 also provides adequate functionality for a user when operated over an analog telephone network. Such devices, however, when operated over an analog telephone network require separate dedicated communication channels for operation and under certain high usage conditions may provide inadequate bandwidth as limited by analog techniques for data transmissions.

Additionally, a computer 40 interacting over a network or analog telephone system also requires a separate communication channel or link for facilitating a connection between a user of computer 40 and a target resource. Computer 40 facilitates transmission of digital data information via an interface 41 which may take the form of an RS-232 communication channel or other interface for exchanging digital data with an analog modem 42. Analog modem 42 provides modulation of the digital data for propagation across a communication channel such as link 43. However, modulated data appearing on link 43 appears in a traditional analog format customary of propagation across an analog channel or network such as a PSTN system. To facilitate conversion to a digital format for operation within ISDN system 30, a terminal adaptor 44 provides a conversion between modulated analog information and the digital format requirements of ISDN system 30. Terminal adapters such as terminal adaptor 44 are commercially available in several form factors. For example, terminal adaptor 44 may take the form of an external stand-alone box comprising the approximate dimensions of an external analog modem or terminal adaptor 44 may be integrated onto a printed circuit board for inclusion within the physical dimensions of computer 40. Additionally, some terminal adapters may bypass analog modem 42 and provide direct interaction with computer 40 by incorporation of standardized modem commands such as the AT command set commonly employed by analog modems.

Although ISDN system 30 employs a somewhat standardized protocol therein, externally interfacing with ISDN system 30 has not assumed such standardization. To facilitate compatible interfacing with ISDN system 30, several interfacing levels have been defined and established, allowing manufacturers to design equipment compatible with such interfaces. For example, a U-interface 48 defines the direct interface standard with ISDN system 30. The U-interface is fully defined for the United States and some other parts of North America. Other countries consider the U-interface to be within ISDN System 30. Such systems incorporating the U-interface within the ISDN system present an S/T-interface 46 as the external interface to the ISDN system. Although equipment may be designed to either standard interface, when an equipment is designed with a S/T-interface, an NT-1 52 converts the two-wire ISDN U-interface 48 into the 8-wire S/T-interface 46. Also, most terminal adapters such as terminal adaptor 44 provide an S/T-interface 45 for indirect coupling with ISDN system 30. Therefore, coupling the S/T-interface 45 of terminal adaptor 44 with ISDN system 30 requires additional signal transformation through a device such as an NT-1 52 or a device providing like functionality.

A portable ISDN interface module such as NT-1 Analog Telephone Device (NATD) 50 provides integration for a plurality of analog devices such as analog telephone 32 via an analog link 34, optionally an analog device such as a facsimile/modem 36 via an analog link 38 and a digital device such as a computer 40 via an S/T-interface 45 to ISDN system 30. NATD 50 provides a direct interface to ISDN system 30 via a U-interface 48 or when an ISDN system presents an S/T-interface 46 as the interface to ISDN system 30, NATD 50 may also interface directly thereto. Therefore, NATD 50 integrates a plurality of functionality heretofore requiring a multiplicity of devices and channels to facilitate multiple interfaces to a digital system such as ISDN system 30.

NATD 50 provides an integrated solution for users of mobile or portable products such as notebook computers and affords such users the ability of, for example, transporting and establishing a portable office environment complete with computer capability, telephonic interaction and facsimile/modem interaction through a digital system such as ISDN system 30.

Figure 3:
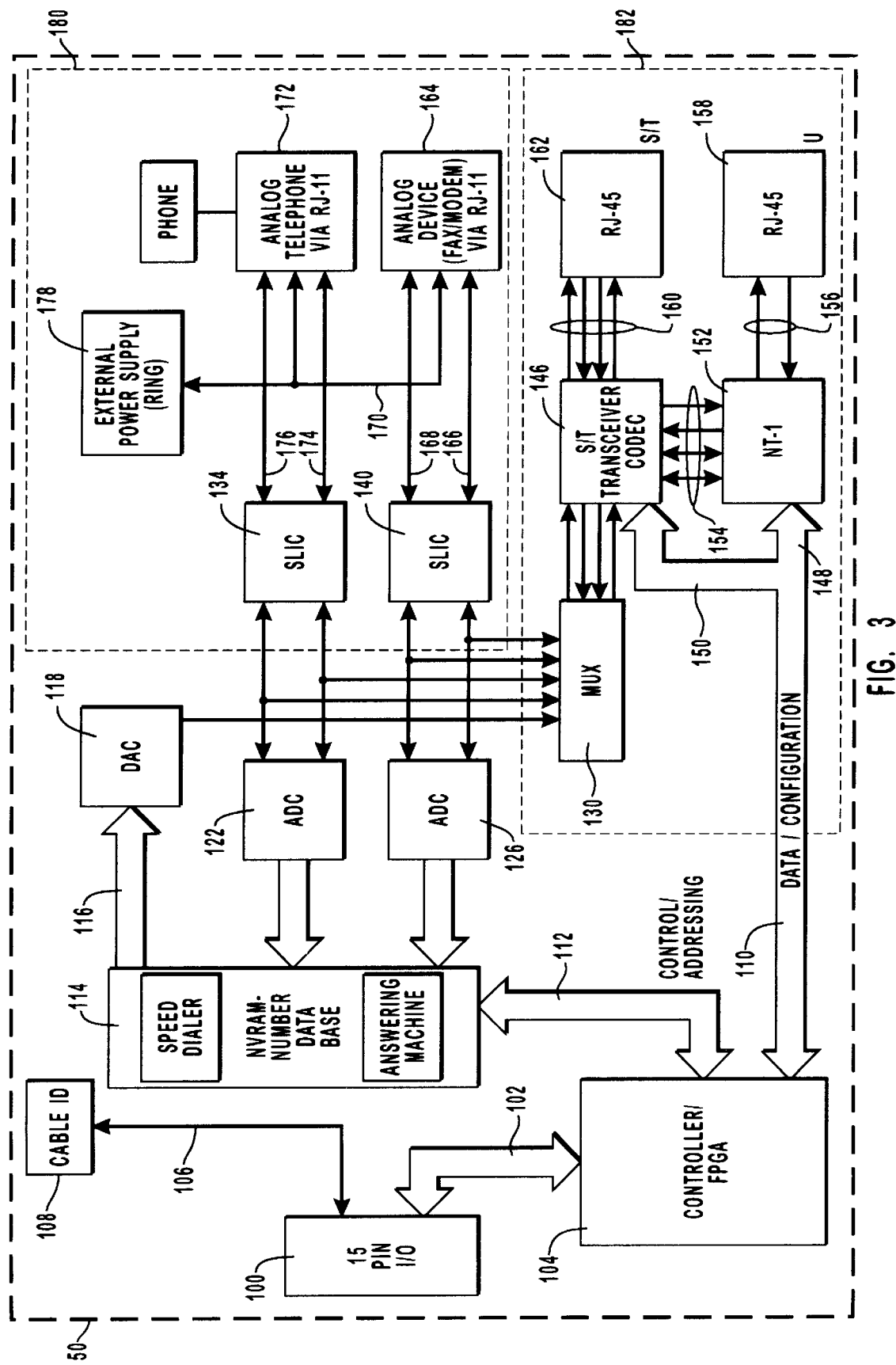
FIG. 3 is a block diagram of an NT-1 analog telephone device for interfacing analog and digital devices directly to an ISDN system, in accordance with an embodiment of the present invention.

FIG. 3 is a block diagram of an NT-1 Analog Telephone Device (NATD), in accordance with an embodiment of the present invention. As alluded to above, NATD 50 may interface with a computer or digital devices via an analog modem and a terminal adaptor or may more directly interface with a computer that digitizes data and presents data thereto in a framed format comparable with framed data generated by a terminal adaptor. For example, data presented at an I/O interface 100, in the preferred embodiment, conforms to the HDLC digital framing standard. An HDLC framer may be implemented within a computer as a layer or layers within an OSI software protocol stack or other discrete devices implementing HDLC formats such as serial communication controllers. HDLC framers implement data framing using well known techniques such as stop flags, start flags and check sum values.

In an alternate embodiment, a cable ID 108 comprises a nonvolatile memory device wherein a computer may query or identify the type of device attached thereto via I/O interface 100. In the preferred embodiment, cable ID 108 is comprised of nonvolatile RAM capable of storing a three byte unique equipment-type identifier value distinguishing NATD 50 from other devices capable of interfacing with the computer. In the preferred embodiment, a cable ID bus 106 comprises a clock line and a serial read data line for retrieving the unique identifier from the non-volatile RAM.

HDLC frame data traverses a data bus 102 for routing and evaluation within a means for generating edits ISDN partitioned channels. By way of example and not limitation, a means for generating a channel may take the form of a controller 104. Additionally, set up and control data destined for consumption by controller 104 may also traverse data bus 102. Controller 104, in the preferred embodiment, is implemented as a field programmable gate array (FPGA) performing execution from a state machine and implementing the standard 2B+D channels of an ISDN service interface or, alternatively, may be implemented as a custom integrated circuit, application specific integrated circuit or embedded controller. Controller 104 routes data as directed by computer 40 (FIG. 2) to either an NVRAM 114 via a bus 112, a transceiver 146 via a bus 150 or to an NT-1 152 via a bus 148.

NVRAM 114 provides buffering storage for interim and long term data. In one embodiment of the present invention, NVRAM 114 provides storage of frequently dialed telephone numbers for providing speed dialing functionality within NATD 50. Alternatively, NVRAM 114 provides interim storage for both greeting and receive messages destined for an absent user, thereby providing the functionality of an answering machine within NATD 50. Additionally, data stored within NVRAM 114 may be transferred via a bus 116 to a digital-to-analog converter 118 for transformation into an analog message or directive. Such a message or directive may take the form of, for example, DTMF tones or annunciations such as an answering machine greeting transferred via a multiplexer 130 to a transceiver 146 for dispatch to the ISDN system.

Analog telephone 32 (FIG. 2) interfaces with an analog telephone interface means 180 having a bi-directional interface for operably coupling an analog telephone with a portable ISDN interface module such as NATD 50. By way of example and not limitation, an analog telephone interface means provides a bi-directional interface for operably coupling analog telephone 32 (FIG. 2) with a portable ISDN interface module such as NATD 50 and may take the form of an analog telephone interface 172 which physically takes the form of a connector such as an RJ-11 for physically receiving a connector from an analog telephone and Subscriber Line Interface Circuits (SLIC) 134. Likewise, fax/modem 36 (FIG. 2) interface with an analog device interface 164 for providing coupling of yet another analog device such as a fax or modem via a physical connection such as an RJ-11. Analog devices such as an analog telephone require voltage levels inconsistent with present day digital data signal levels. An external power supply 178 provides a TIP/RING signal 170 having compatible voltage and current levels for interacting with analog devices such as an analog telephone and may form a portion of the analog telephone interface means detailed above.

Signals 166, 168, 174 and 176 interface analog signals from analog devices such as analog telephones with SLIC 134 and 140. SLIC 134 performs signal level translation of analog signals between analog telephone interface 172 and both an analog-to-digital converter 122 and multiplexer 130. Likewise, SLIC 140 performs signal level translation of analog signals between analog device interface 164 and both an analog-to-digital converter 126 and multiplexer 130. Signal level translation of analog signals permits the CODEC within transceiver 146 to compatibly encode and decode the analog signals.

NATD 50 is further comprised of an ISDN interface means 182 comprised, in the preferred embodiment, of a multiplexer 130 and transceiver/CODEC 146. Multiplexer 130 selects the appropriate source information for routing to the CODEC within transceiver 146. For example, analog telephone signals received from analog telephone interface 172 are multiplexed to the CODEC of transceiver 146 for dispatch to the ISDN system. The CODEC then performs analog-to-digital conversion of an incoming analog telephone signal or an analog fax or modem signal. Control information also passes from controller 104 via a bus 110 to transceiver 146 for initialization and configuration of the CODEC within transceiver 146. An IOM-2 154 bus provides a clock and sync pulse for relaying data between NT-1 152 and transceiver 146.

It should be noted that NATD 50 provides a more universal interface with the ISDN system by providing both a U-interface 156 via a connector 158 and an S/T-interface 160 via connector 162 for accommodating ISDN systems incorporating NT-1 functionality internally as well as those systems requiring an NT-1 device.

Therefore, NATD 50 provides an ISDN interface module capable of providing an ISDN interface with signal access at both the S/T-interface point and the U-interface point within an integrated module. An analog telephone can be connected to NATD 50 enabling a user to place voice calls over an ISDN system concurrent with the exchange of digital data from a computer over the same ISDN system interface.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by united states letters patent is:

1. In an Integrated Services Digital Network (ISDN), a portable ISDN interface module for interfacing an analog telephone and a computer with said ISDN, comprising:

a. an analog telephone interface means having a bi-directional interface for operably coupling said analog telephone with said portable ISDN interface module for transceiving analog information therebetween;

b. a channel generating means for formatting concurrent ISDN partitioned channels, at least one of said concurrent ISDN partitioned channels for transceiving said analog information and at least one of said concurrent ISDN partitioned channels for transceiving digital data information on one of said concurrent ISDN partitioned channels; and c. an ISDN interface means coupled with both said channel generating means and said analog telephone interface means for transceiving and converting between said analog information and digitized analog information, said ISDN interface means also multiplexing said digitized analog information and said digital data information into said concurrent ISDN partitioned channels.

2. The portable ISDN interface module for interfacing an analog telephone and a computer with said ISDN as recited in claim 1, wherein said analog telephone interface means comprises:

a. a subscriber line interface circuit (SLIC) coupled to said bi-directional interface for translating signal levels of said analog information; and b. an external power input signal coupled to said bi-directional interface for providing a TIP/RING signal to said analog telephone.

3. The portable ISDN interface module for interfacing an analog telephone and a computer with said ISDN as recited in claim 2, further comprising:

a. an analog-to-digital converter coupled to said SLIC for digitizing portions of said analog information into digitized information for storage; and b. a non-volatile RAM operably coupled to said analog-to-digital converter for storing said digitized information.

4. The portable ISDN interface module for interfacing an analog telephone and a computer with said ISDN as recited in claim 3, wherein a first portion of said non-volatile RAM comprises a means for temporarily storing said digitized information comprising messages destined for said analog telephone.

5. The portable ISDN interface module as recited in claim 3, wherein a second portion of said non-volatile RAM comprises a means for storing said digitized information comprising dialing directives for call routing by said ISDN.

6. The portable ISDN interface module as recited in claim 3, further comprising a digital-to-analog converter for operably coupled to said non-volatile RAM for receiving digitized annunciations therefrom and converting said digitized annunciations to analog annunciations for delivery to said ISDN interface means.

7. The portable ISDN interface module for interfacing an analog telephone and a computer with said ISDN as recited in claim 1, wherein said ISDN interface means comprises:

a. a CODEC operably coupled to said analog telephone interface means for converting between said analog information and digitized analog information; and b. a transceiver operably coupled to said CODEC for implementing an S/T-interface providing interoperability with said ISDN and for multiplexing said digitized analog information and said digital data information as received from said ISDN interface means into said ISDN partitioned channels.

8. The portable ISDN interface module for interfacing an analog telephone and a computer with said ISDN as recited in claim 7, wherein said ISDN interface means further comprises a Network Termination-1 (NT-1) for translating between said S/T-interface and a U-interface.

9. A portable Integrated Services Digital Network (ISDN) interface module for integrating both an analog interface of an analog telephone and a digital data interface of a computer into a standardized ISDN interface, said portable ISDN interface module comprising:

a. an analog telephone interface means capable of receiving analog information from said analog telephone;

b. a controller for generating concurrent ISDN partitioned channels between said ISDN interface module and said ISDN, said concurrent ISDN partitioned channels for transceiving said analog information and at least one of said concurrent ISDN partitioned channels for transceiving digital data information on one of said concurrent ISDN partitioned channels, said controller also capable of receiving digital data information from said computer;

c. an ISDN interface means operable coupled to said analog telephone interface means for converting said analog information to digitized analog information and for multiplexing said digitized analog information and said digital data information as received from said controller into said concurrent ISDN partitioned channels.

10. The portable Integrated Services Digital Network (ISDN) interface module as recited in claim 9, wherein said analog telephone interface means further comprising:

a. a subscriber line interface circuit (SLIC) for translating signal levels of said analog information; and b. an external power input signal coupled to said bi-directional interface for providing a TIP/RING signal to said analog telephone for caller notification.

11. The portable Integrated Services Digital Network (ISDN) interface module as recited in claim 10, wherein said ISDN interface means comprises:

a. a CODEC operably coupled to said analog telephone interface means for converting between said analog information and digitized analog information; and b. a transceiver operably coupled to said CODEC for implementing an S/T-interface providing interoperability with said ISDN and for multiplexing said digitized analog information and said digital data information as received from said controller into said ISDN partitioned channels.

12. The portable Integrated Services Digital Network (ISDN) interface module as recited in claim 11, wherein said ISDN interface means further comprises a Network Termination-1 (NT-1) for translating between said S/T-interface and a U-interface compliant with said ISDN.

13. The portable Integrated Services Digital Network (ISDN) interface module as recited in claim 12, further comprising:

a. an analog-to-digital converter operably coupled to said analog telephone interface means for digitizing portions of said analog information into digitized information for storage;

b. a non-volatile RAM operably coupled to said analog telephone interface via said analog-to-digital converter and said processor, said nonvolatile RAM for storing said digitized information for later replay.

14. The portable Integrated Services Digital Network (ISDN) interface module as recited in claim 13, wherein said non-volatile RAM further comprises a first portion providing temporary storage of said digitized information destined for said analog telephone thereby implementing answering machine functionality.

15. The portable Integrated Services Digital Network (ISDN) interface module as recited in claim 13, wherein said non-volatile RAM further comprises a second portion providing storage of dialing directives for call routing thereby implementing speed-dialing functionality.

16. The portable Integrated Services Digital Network (ISDN) interface module as recited in claim 13, further comprising a digital-to-analog converter operably coupled to said non-volatile RAM and said ISDN interface means for receiving digitized annunciations from said non-volatile RAM and for converting said digitized annunciations into analog annunciations for deliver over said ISDN.

17. In a portable Integrated Services Digital Network (ISDN) interface module for operation within an ISDN, a method for integrating both an analog telephone via an analog interface and a computer via a digital data interface with said ISDN, said method comprising the steps of:

a. generating concurrent ISDN partitioned channels between said ISDN interface module and said ISDN;

b. receiving analog information from said analog telephone via said analog interface and digital data information from said computer via said digital data interface;

c. converting said analog information to digitized analog information; and d. multiplexing said digitized analog information and said digital data information into said concurrent ISDN partitioned channels, said concurrent ISDN partitioned channels for transceiving said analog information and at least one of said concurrent ISDN partitioned channels for transceiving digital data information on one of said concurrent ISDN partitioned channels.

18. The method for integrating both an analog telephone via an analog interface and a computer via a digital data interface with said ISDN as recited in claim 17, wherein said transceiving step further comprises the steps of:

a. translating signal levels of said analog information; and b. providing a TIP/RING signal to said analog telephone for caller notification.

19. The method for integrating both an analog telephone via an analog interface and a computer via a digital data interface with said ISDN as recited in claim 17, wherein said transceiving step further comprises the steps of:

a. digitizing with an analog-to-digital converter portions of said analog information into digitized information for storage; and b. storing said digitized information within a non-volatile RAM for later replay.

20. The method for integrating both an analog telephone via an analog interface and a computer via a digital data interface with said ISDN as recited in claim 19, wherein said transceiving step further comprises the step of temporarily storing said digitized information destined for said analog telephone in a first portion of said non-volatile RAM.

21. The method for integrating both an analog telephone via an analog interface and a computer via a digital data interface with said ISDN as recited in claim 19, wherein said transceiving step further comprises the step of storing said digitized information comprising dialing directives for call routing by said ISDN in a second portion of said non-volatile RAM.

22. The method for integrating both an analog telephone via an analog interface and a computer via a digital data interface with said ISDN as recited in claim 19, further comprising the steps of:

a. receiving digitized annunciations from said non-volatile RAM; and b. converting said digitized annunciations into analog annunciations for delivery over said ISDN.

* * * * *